United States Patent
Kasuya et al.

(10) Patent No.: US 12,209,147 B2
(45) Date of Patent: Jan. 28, 2025

(54) CYCLIC OLEFIN-BASED RESIN COMPOSITION, MOLDED PRODUCT, AND OPTICAL COMPONENT

(71) Applicant: MITSUI CHEMICALS, INC., Tokyo (JP)

(72) Inventors: Masakatsu Kasuya, Chiba (JP); Kouichi Kizu, Narashino (JP); Yasuyuki Soeda, Tokyo (JP); Takayuki Okuno, Ichihara (JP); Hisahiro Kato, Ichihara (JP); Keisuke Endo, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 517 days.

(21) Appl. No.: 17/613,969

(22) PCT Filed: May 14, 2020

(86) PCT No.: PCT/JP2020/019327
§ 371 (c)(1),
(2) Date: Nov. 24, 2021

(87) PCT Pub. No.: WO2020/241288
PCT Pub. Date: Dec. 3, 2020

(65) Prior Publication Data
US 2022/0227896 A1    Jul. 21, 2022

(30) Foreign Application Priority Data

May 27, 2019   (JP) .................................. 2019-098759
Mar. 18, 2020  (JP) .................................. 2020-048237

(51) Int. Cl.
| | |
|---|---|
| *C08F 10/02* | (2006.01) |
| *C08K 5/3435* | (2006.01) |
| *C08K 5/353* | (2006.01) |
| *G02B 1/04* | (2006.01) |

(52) U.S. Cl.
CPC ............ *C08F 10/02* (2013.01); *C08K 5/3435* (2013.01); *C08K 5/353* (2013.01); *G02B 1/04* (2013.01); *C08F 2500/32* (2021.01)

(58) Field of Classification Search
CPC ..... C08K 5/005; C08K 5/3435; C08F 210/02; C08F 232/04; C08F 232/08; C08G 61/08; C08L 23/0823; C08L 65/00; G02B 1/041
See application file for complete search history.

(56) References Cited

U.S. PATENT DOCUMENTS

| | | |
|---|---|---|
| 6,541,547 B1 | 4/2003 | Schmutz et al. |
| 2008/0304393 A1 | 12/2008 | Shibuya et al. |
| 2009/0050196 A1 | 2/2009 | Kaneko et al. |
| 2009/0118400 A1 | 5/2009 | Sawaguchi |
| 2018/0188420 A1 | 7/2018 | Furuko et al. |

FOREIGN PATENT DOCUMENTS

| | | |
|---|---|---|
| CN | 101213252 A | 7/2008 |
| CN | 101885701 A | 11/2010 |
| FR | 2 738 834 A1 | 3/1997 |
| JP | 2006-045545 A | 2/2006 |
| JP | 2006-143931 A | 6/2006 |
| JP | 2007-231168 A | 9/2007 |
| JP | 2014234431 A | 12/2014 |
| WO | 2006/100974 A1 | 9/2006 |
| WO | 2017006600 A1 | 1/2017 |

OTHER PUBLICATIONS

Borhani, et al, "Role of solvents in CO2 capture process: The review of selection and design methods," Renewable and Sustainable Energy Reviews, 114, pp. 1-20 (2019). (Year: 2019).*

* cited by examiner

*Primary Examiner* — Fred M Teskin
(74) *Attorney, Agent, or Firm* — BUCHANAN INGERSOLL & ROONEY PC

(57) ABSTRACT

Provided is a cyclic olefin-based resin composition including a cyclic olefin-based polymer (A), and a hindered amine compound (Y) that contains a piperidyl group represented by General Formula (1) and a carboxylic acid amide group represented by General Formula (2) within the same molecule.

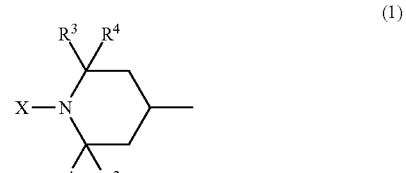

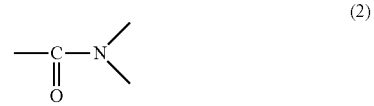

13 Claims, No Drawings

CYCLIC OLEFIN-BASED RESIN COMPOSITION, MOLDED PRODUCT, AND OPTICAL COMPONENT

TECHNICAL FIELD

The present invention relates to a cyclic olefin-based resin composition, a molded product, and an optical component.

BACKGROUND ART

In recent years, there has been an increasing demand for in-vehicle camera lenses and camera lenses for mobile devices (mobile phones, smartphones, tablets, and the like). High heat resistance is required for the in-vehicle camera lenses and the camera lenses for the mobile devices, and in particular, glass having high heat resistance is often used as a material for the in-vehicle camera lenses. However, from the viewpoint of cost and weight reduction, there is a strong demand for replacement with resin materials, and various optical resins are being used for the in-vehicle camera lenses.

A cyclic olefin-based resin composition is used as an optical resin since the cyclic olefin-based resin composition has excellent optical performance.

Examples of techniques relating to the cyclic olefin-based resin composition used for an optical component include those described in Patent Document 1 (Japanese Unexamined Patent Publication No. 2014-234431) and Patent Document 2 (Pamphlet of International Publication No. WO2017/006600).

In Patent Document 1, an antifogging agent for a cyclic olefin-based resin is described, in which the antifogging agent for a cyclic olefin-based resin is contained in a cyclic olefin-based resin composition that contains a cyclic olefin-based resin and that is used for maintaining the transparency of a molded product obtained from the cyclic olefin-based resin composition, and consisting of a trivalent phosphorus compound that contains a hindered hydroxyphenyl group. In Patent Document 1, it is described that a cyclic olefin-based resin composition in which transparency and heat resistance of the cyclic olefin-based resin are not impaired by using the antifogging agent for a cyclic olefin-based resin, and an optical material and an optical component in which the composition is used can be obtained.

In Patent Document 2, a resin composition containing an alicyclic structure-containing polymer, a hindered phenolic antioxidant having a specific structure, and a hindered amine compound having a specific structure is described. In Patent Document 2, it is described that in a case where such a resin composition is used, an optical member made of a resin molded product having excellent heat yellowing resistance as well as excellent optical characteristics can be obtained.

RELATED DOCUMENTS

Patent Documents

[Patent Document 1] Japanese Unexamined Patent Publication No. 2014-234431
[Patent Document 2] Pamphlet of International Publication No. WO2017/006600

SUMMARY OF THE INVENTION

Technical Problem

However, the resin material tends to deteriorate due to high temperature, and lenses made of the resin material may be colored yellow, for example. In a case where the lenses are colored yellow, the blue light in the visible range is absorbed by the lenses, and an image recognized by an image sensor deteriorates, which adversely affects the role of the in-vehicle camera, such as object recognition. Therefore, it is required that the optical resin used for the in-vehicle camera lenses or the like is difficult to be colored in a high temperature environment.

In many cases, additives such as antioxidants are added to a resin in order to secure long-term stability during manufacturing, or after shipping or molding. These antioxidants also have a role of suppressing the coloring of the resin in the high temperature environment, but there were many cases in which the coloring of the resin in the high temperature environment cannot be sufficiently suppressed through formulation of the antioxidants in the formulation of the related art.

The present invention has been made in view of the above circumstances, and an object is to provide a cyclic olefin-based resin composition capable of realizing an optical component which has a low internal haze and in which occurrence of coloring in a high temperature environment is suppressed.

Solution to Problem

The present inventors have diligently studied to solve the above problems. As a result, the present inventors have found that an optical component, which has a low internal haze and in which occurrence of coloring in a high temperature environment is suppressed, can be realized by using a resin composition in which a hindered amine compound having a specific structure is combined with a cyclic olefin-based polymer, and as a result, the present inventors have achieved the present invention.

The present invention is as shown below.

[1]

A cyclic olefin-based resin composition including a cyclic olefin-based polymer (A), and a hindered amine compound (Y) that contains a piperidyl group represented by General Formula (1) and a carboxylic acid amide group represented by General Formula (2) within the same molecule.

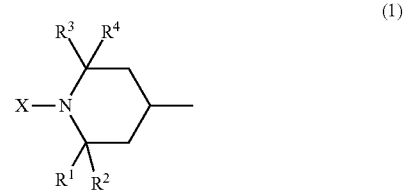

(In General Formula (1), X is a hydrogen atom, an oxyradical group, an alkyl group, an alkoxy group, an aryl group, or a hydroxy group, and $R^1$ to $R^4$ are each independently a hydrogen atom or an alkyl group.)

[2]
In the cyclic olefin-based resin composition according to [1],
the cyclic olefin-based resin composition is a resin composition for an optical component.

[3]
In the cyclic olefin-based resin composition according to [1] or [2], the hindered amine compound (Y) further contains an alicyclic structure represented by General Formula (3) within the same molecule.

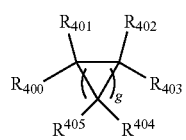
(3)

(In General Formula (3), at least one of $R^{400}$, $R^{401}$, $R^{402}$, $R^{403}$, $R^{404}$, or $R^{405}$ is a binder, and except for the binder, remainders are each independently a hydrogen atom or a hydrocarbon group having 1 to 5 carbon atoms, and g is equal to or more than 1 and equal to or less than 18.)

[4]
In the cyclic olefin-based resin composition according to [3], the alicyclic structure represented by General Formula (3) has a spiro-bond.

[5]
In the cyclic olefin-based resin composition according to any one of [1] to [4],
the hindered amine compound (Y) has a structure represented by General Formula (4).

(4)

(In General Formula (4), at least one of $R_5$, $R_6$, or $R_7$ is a binder, and except for the binder, $R_5$ and $R_6$ are each independently a hydrogen atom or a hydrocarbon group having 1 to 20 carbon atoms, and Ry is a hydrogen atom, a hydrocarbon group having 1 to 20 carbon atoms, or a structure represented by General Formula (4-1).)

(4-1)

(In General Formula (4-1), n is 0 to 10, and $R_8$ is a hydrocarbon group having 1 to 20 carbon atoms.)

[6]
In the cyclic olefin-based resin composition according to any one of [1] to [5],
the hindered amine compound (Y) includes at least one selected from a compound represented by General Formula (5) or a compound represented by General Formula (6).

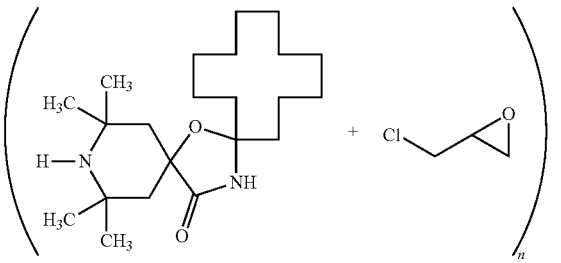

[7]
In the cyclic olefin-based resin composition according to any one of [1] to [6],
the cyclic olefin-based polymer (A) includes at least one selected from a copolymer (A1) of ethylene or an α-olefin and a cyclic olefin or a ring-opening polymer (A2) of a cyclic olefin.

[8]
In the cyclic olefin-based resin composition according to [7], the cyclic olefin-based polymer (A) includes the copolymer (A1), and
the copolymer (A1) contains
a repeating unit (a) derived from at least one olefin represented by General Formula (I), and
a repeating unit (b) derived from at least one cyclic olefin selected from the group consisting of a repeating unit represented by General Formula (II), a repeating unit represented by General Formula (III), a repeating unit represented by General Formula (IV), a repeating unit represented by General Formula (V), and a repeating unit represented by General Formula (VI).

(I)

(In General Formula (I), $R^{300}$ represents a hydrogen atom or a linear or branched hydrocarbon group having 1 to 29 carbon atoms.)

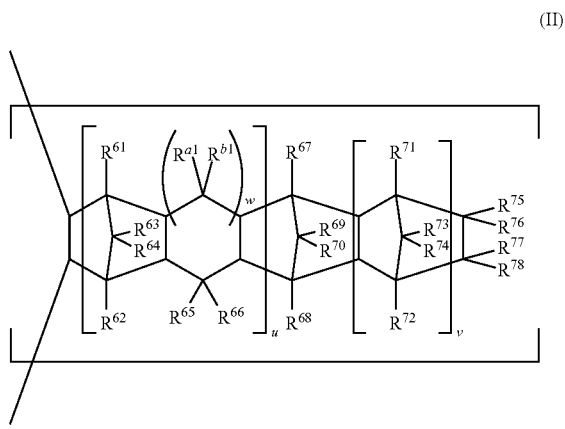

(II)

(In General Formula (II), u is 0 or 1, v is 0 or a positive integer, w is 0 or 1, $R^{61}$ to $R^{78}$ and $R^{a1}$ and $R^{b1}$ may be the same or different from each other and are each a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may be bonded to each other to form a monocyclic ring or a polycyclic ring.)

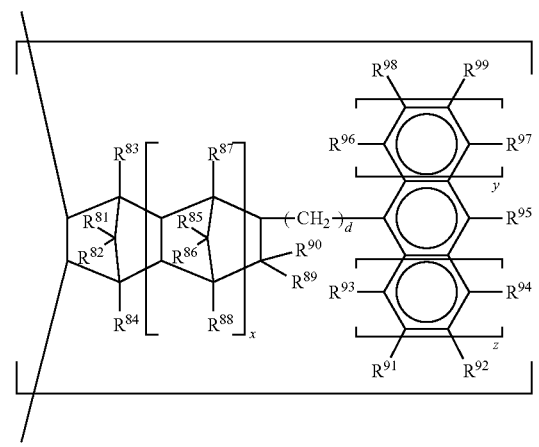

(III)

(In General Formula (III), x and d are each an integer of 0 or equal to or more than 1, y and z are each 0, 1, or 2, $R^{81}$ to $R^{99}$ may be the same or different from each other and are each a hydrogen atom, a halogen atom, an aliphatic hydrocarbon group that is an alkyl group having 1 to 20 carbon atoms or a cycloalkyl group having 3 to 15 carbon atoms, and an aromatic hydrocarbon group having 6 to 20 carbon atoms or an alkoxy group, a carbon atom to which $R^{89}$ and $R^{90}$ are bonded and a carbon atom to which $R^{93}$ is bonded or a carbon atom to which $R^{91}$ is bonded may be bonded directly or through an alkylene group having 1 to 3 carbon atoms, and in a case of y=z=0, $R^{95}$ and $R^{92}$ or $R^{95}$ and $R^{99}$ may be bonded to each other to form a monocyclic aromatic ring or a polycyclic aromatic ring.)

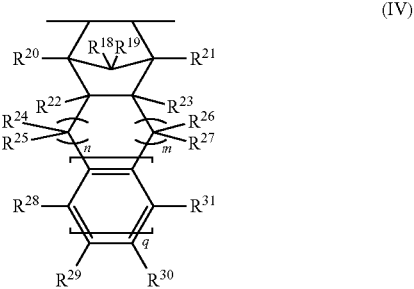

(IV)

(In General Formula (IV), n and m are each independently 0, 1, or 2, q is 1, 2, or 3, $R^{18}$ to $R^{31}$ are each independently a hydrogen atom, a halogen atom excluding a fluorine atom, or a hydrocarbon group having 1 to 20 carbon atoms, which may be substituted with a halogen atom excluding a fluorine atom, and in a case of q=1, $R^{28}$ and $R^{29}$, $R^{29}$ and $R^{30}$, and $R^{30}$ and $R^{31}$ may be bonded to each other to form a monocyclic ring or a polycyclic ring and in a case of q=2 or 3, $R^{28}$ and $R^{28}$, $R^{28}$ and $R^{29}$, $R^{29}$ and $R^{30}$, $R^{30}$ and $R^{31}$, and $R^{31}$ and $R^{31}$ may be bonded to each other to form a monocyclic ring or a polycyclic ring, and the monocyclic ring or the polycyclic ring may be an aromatic ring.)

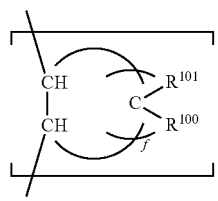

(V)

(In General Formula (V), $R^{100}$ and $R^{101}$ may be the same or different from each other and are each represent a hydrogen atom or a hydrocarbon group having 1 to 5 carbon atoms, and f is 1≤f≤18.)

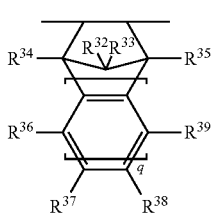

(VI)

(In General Formula (VI), q is 1, 2, or 3, $R^{32}$ to $R^{39}$ are each independently a hydrogen atom, a halogen atom excluding a fluorine atom, or a hydrocarbon group having 1 to 20 carbon atoms, which may be substituted with a halogen atom excluding a fluorine atom, and in a case of q=1, $R^{36}$ and $R^{37}$, $R^{37}$ and $R^{38}$, and $R^{38}$ and $R^{39}$ may be bonded to each other to form a monocyclic ring or a polycyclic ring and in a case of q=2 or 3, $R^{36}$ and $R^{36}$, $R^{36}$ and $R^{37}$, $R^{37}$ and $R^{38}$, $R^{38}$ and $R^{39}$, and $R^{39}$ and $R^{39}$ may be bonded to each other to form a monocyclic ring or a polycyclic ring, the monocyclic ring or the polycyclic ring may have a double bond, and the monocyclic ring or the polycyclic ring may be an aromatic ring.)

[9]

In the cyclic olefin-based resin composition according to [8], the repeating unit (b) derived from the cyclic olefin in the copolymer (A1) includes a repeating unit derived from at least one compound selected from bicyclo[2.2.1]-2-heptene, tetracyclo[4.4.0.1$^{2,5}$.1$^{7,10}$]-3-dodecene, and benzonorbornadiene.

[10]

In the cyclic olefin-based resin composition according to [8] or [9], the repeating unit (a) derived from the olefin in the copolymer (A1) includes a repeating unit derived from ethylene.

[11]

In the cyclic olefin-based resin composition according to any one of [1] to [10], in a case where a content of the cyclic olefin-based polymer (A) contained in the cyclic olefin-based resin composition is 100 parts by mass, a content of the hindered amine compound (Y) is equal to or more than 0.05 parts by mass and equal to or less than 5.0 parts by mass.

[12]

In the cyclic olefin-based resin composition according to any one of [1] to [11], a glass transition temperature of the cyclic olefin-based resin composition is within a range of equal to or higher than 130° C. and equal to or lower than 180° C.

[13]

A molded product containing the cyclic olefin-based resin composition according to any one of [1] to [12].

[14]

An optical component including the molded product according to [13].

[15]

In the optical component according to [14], the optical component is an fθ lens, an imaging lens, a sensor lens, a prism, or a light guide plate.

Advantageous Effects of Invention

According to the present invention, it is possible to provide a cyclic olefin-based resin composition capable of realizing an optical component which has a low internal haze and in which occurrence of coloring in a high temperature environment is suppressed.

DESCRIPTION OF EMBODIMENTS

Hereinafter, embodiments of the present invention will be described. "A to B" representing a numerical range indicates equal to or more than A and equal to or less than B, unless otherwise specified.

[Cyclic Olefin-Based Resin Composition]

First, a cyclic olefin-based resin composition of an embodiment according to the present invention will be described.

The cyclic olefin-based resin composition according to the present embodiment includes a cyclic olefin-based polymer (A), and a hindered amine compound (Y) that contains a piperidyl group represented by General Formula (1) and a carboxylic acid amide group represented by General Formula (2) within the same molecule.

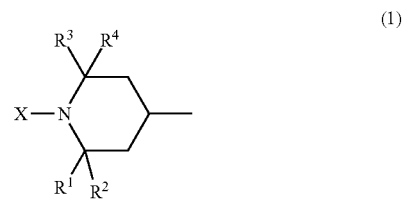

In General Formula (1), X is a hydrogen atom, an oxyradical group, an alkyl group, an alkoxy group, an aryl group, or a hydroxy group, and R$^1$ to R$^4$ are each independently a hydrogen atom or an alkyl group.

According to the cyclic olefin-based resin composition of the present embodiment, it is possible to realize the optical component which has a low internal haze and in which occurrence of coloring in a high temperature environment is suppressed.

Although the reason for this is not clear, it is considered that this is because the hindered amine compound (Y) that contains a piperidyl group represented by General Formula (1) and a carboxylic acid amide group represented by General Formula (2) within the same molecule has good compatibility with the cyclic olefin-based polymer (A), and the dispersibility of the hindered amine compound (Y) into the cyclic olefin-based polymer (A) can be improved.

For the above reason, the cyclic olefin-based resin composition according to the present embodiment can be suitably used for the optical component.

The lower limit of a total content of the cyclic olefin-based polymer (A) and the hindered amine compound (Y) in the cyclic olefin-based resin composition according to the present embodiment is preferably equal to or more than 70% by mass, more preferably equal to or more than 80% by mass, even more preferably equal to or more than 90% by mass, and particularly preferably equal to or more than 95% by mass in a case where the total cyclic olefin-based resin composition is 100% by mass. The total content of the cyclic olefin-based polymer (A) and the hindered amine compound (Y) in the cyclic olefin-based resin composition according to the present embodiment is equal to or more than the above lower limit, so that optical performance can be further improved.

The upper limit of the total content of the cyclic olefin-based polymer (A) and the hindered amine compound (Y) in the cyclic olefin-based resin composition according to the present embodiment is not particularly limited, but is, for example, equal to or less than 100% by mass.

Hereinafter, each component will be specifically described.

(Cyclic Olefin-Based Polymer (A))

The cyclic olefin-based polymer (A) according to the present embodiment is a polymer having a repeating unit derived from the cyclic olefin as an essential constituent unit.

Examples of the cyclic olefin-based polymer (A) include at least one selected from a copolymer (A1) of ethylene or an α-olefin and a cyclic olefin or a ring-opening polymer (A2) of a cyclic olefin.

A cyclic olefin compound constituting the copolymer (A1) according to the present embodiment is not particularly limited, and examples thereof include cyclic olefin monomers described in paragraphs 0037 to 0063 of Pamphlet of International Publication No. WO2006/118261.

From the viewpoint that while maintaining a good performance balance of transparency and a refractive index of the obtained molded product, heat resistance can be further improved and moldability can be improved, the copolymer (A1) according to the present embodiment preferably contains a repeating unit (a) derived from at least one olefin represented by General Formula (I), and a repeating unit (b) derived from at least one cyclic olefin selected from the group consisting of a repeating unit represented by General Formula (II), a repeating unit represented by General Formula (III), a repeating unit represented by General Formula (IV), a repeating unit represented by General Formula (V), and a repeating unit represented by General Formula (VI).

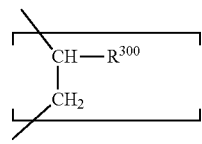

(I)

In General Formula (I), $R^{300}$ represents a hydrogen atom or a linear or branched hydrocarbon group having 1 to 29 carbon atoms.

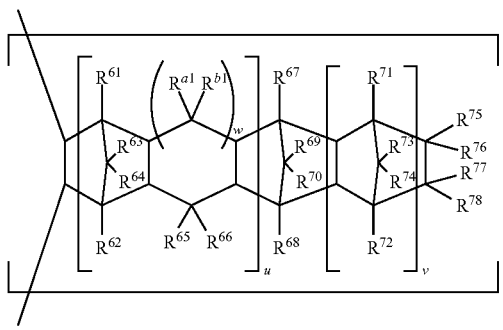

(II)

In General Formula (II), u is 0 or 1, v is 0 or a positive integer, preferably an integer of equal to or more than 0 and equal to or less than 2, and more preferably 0 or 1, w is 0 or 1, $R^{61}$ to $R^{78}$ and $R^{a1}$ and $R^{b1}$ may be the same or different from each other and are each a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may be bonded to each other to form a monocyclic ring or a polycyclic ring.

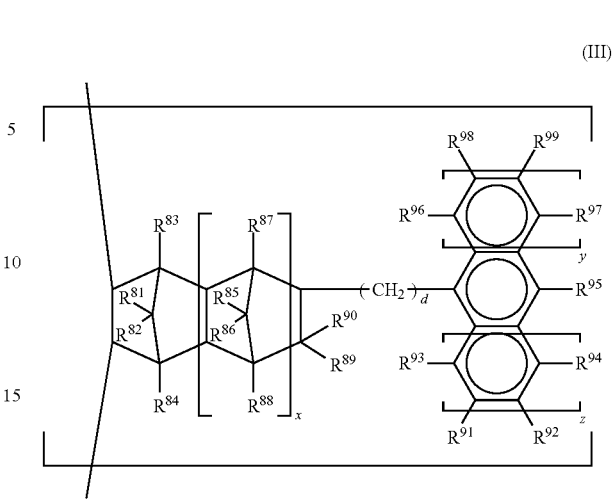

(III)

In General Formula (III), x and d are each an integer of 0 or equal to or more than 1, preferably an integer of equal to or more than 0 and equal to or less than 2, and more preferably 0 or 1, y and z are each 0, 1, or 2, $R^{81}$ to $R^{99}$ may be the same or different from each other and are each a hydrogen atom, a halogen atom, an aliphatic hydrocarbon group that is an alkyl group having 1 to 20 carbon atoms or a cycloalkyl group having 3 to 15 carbon atoms, and an aromatic hydrocarbon group having 6 to 20 carbon atoms or an alkoxy group, a carbon atom to which $R^{89}$ and $R^{90}$ are bonded and a carbon atom to which $R^{93}$ is bonded or a carbon atom to which $R^{91}$ is bonded may be bonded directly or through an alkylene group having 1 to 3 carbon atoms, and in a case of y=z=0, $R^{95}$ and $R^{92}$ or $R^{95}$ and $R^{99}$ may be bonded to each other to form a monocyclic aromatic ring or a polycyclic aromatic ring.

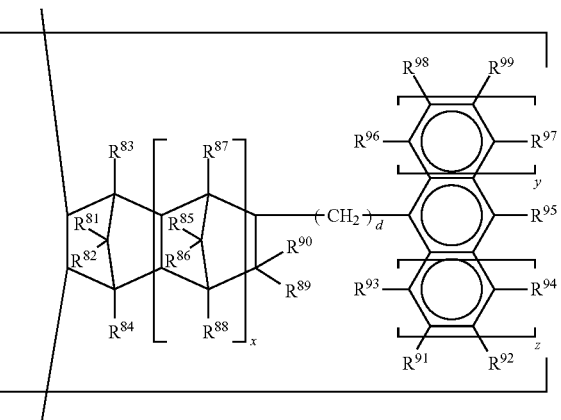

(IV)

In General Formula (IV), n and m are each independently 0, 1, or 2, q is 1, 2, or 3. m is preferably 0 or 1, and more preferably 1. n is preferably 0 or 1, and more preferably 0. q is preferably 1 or 2, and more preferably 1.

$R^{18}$ to $R^{31}$ are each independently a hydrogen atom, a halogen atom excluding a fluorine atom, or a hydrocarbon group having 1 to 20 carbon atoms, which may be substituted with a halogen atom excluding a fluorine atom, and $R^{18}$ to $R^{31}$ are each independently preferably a hydrogen atom or a hydrocarbon group having 1 to 20 carbon atoms, and more preferably a hydrogen atom.

In addition, in a case of q=1, $R^{28}$ and $R^{29}$, $R^{29}$ and $R^{30}$, and $R^{30}$ and $R^{31}$ may be bonded to each other to form a monocyclic ring or a polycyclic ring, in a case of q=2 or 3, $R^{28}$ and $R^{28}$, $R^{28}$ and $R^{29}$, $R^{29}$ and $R^{30}$, $R^{30}$ and $R^{31}$, and $R^{31}$ and $R^{31}$ may be bonded to each other to form a monocyclic ring or a polycyclic ring, and the monocyclic ring or the polycyclic ring may be an aromatic ring.

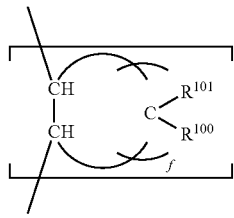
(V)

In General Formula (V), $R^{100}$ and $R^{101}$ may be the same or different from each other, and each represent a hydrogen atom or a hydrocarbon group having 1 to 5 carbon atoms, and f is $1 \leq f \leq 18$.

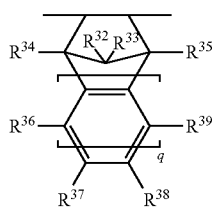
(VI)

In General Formula (VI), q is 1, 2, or 3, $R^{32}$ to $R^{39}$ are each independently a hydrogen atom, a halogen atom excluding a fluorine atom, or a hydrocarbon group having 1 to 20 carbon atoms, which may be substituted with a halogen atom excluding a fluorine atom, and in a case of q=1, $R^{36}$ and $R^{37}$, $R^{37}$ and $R^{38}$, and $R^{38}$ and $R^{39}$ may be bonded to each other to form a monocyclic ring or a polycyclic ring and in a case of q=2 or 3, $R^{36}$ and $R^{36}$, $R^{36}$ and $R^{37}$, $R^{37}$ and $R^{38}$, $R^{38}$ and $R^{39}$, and $R^{39}$ and $R^{39}$ may be bonded to each other to form a monocyclic ring or a polycyclic ring, the monocyclic ring or the polycyclic ring may have a double bond, and the monocyclic ring or the polycyclic ring may be an aromatic ring.

An olefin monomer that is one of copolymerization raw materials of the copolymer (A1) according to the present embodiment is subjected to addition-copolymerization to form a constituent unit represented by General Formula (I). Specifically, an olefin monomer represented by General Formula (Ia) corresponding to General Formula (I) is used.

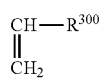
(Ia)

In General Formula (Ia), $R^{300}$ represents a hydrogen atom or a linear or branched hydrocarbon group having 1 to 29 carbon atoms. Examples of the olefin monomer represented by General Formula (Ia) include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and the like. Among these, ethylene and propylene are preferable, and ethylene is particularly preferable, from the viewpoint of obtaining a molded product having more excellent heat resistance, mechanical characteristics, and optical characteristics. Two or more kinds of olefin monomers represented by General Formula (Ia) may be used.

In a case where the total of the constituent units constituting the cyclic olefin copolymer according to the present embodiment is 100 mol %, a percentage of the repeating unit (a) derived from the olefin is preferably equal to or more than 5 mol % and equal to or less than 95 mol %, more preferably equal to or more than 20 mol % and equal to or less than 90 mol %, even more preferably equal to or more than 40 mol % and equal to or less than 85 mol %, and particularly preferably equal to or more than 50 mol % and equal to or less than 80 mol %.

The percentage of the repeating unit (a) derived from olefin can be measured by 13C-NMR.

A cyclic olefin monomer (b) that is one of the copolymerization raw materials of the copolymer (A1) according to the present embodiment is subjected to addition-copolymerization to form the repeating unit (b) derived from the cyclic olefin represented by General Formula (II), General Formula (III), General Formula (IV), General Formula (V), or General Formula (VI). Specifically, the cyclic olefin monomer (b) represented by General Formulae (IIa), (IIIa), (IVa), (Va), and (VIa) that respectively correspond to General Formula (II), General Formula (III), General Formula (IV), General Formula (V), and General Formula (VI) is used.

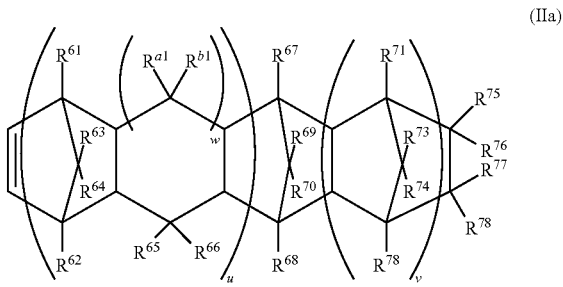
(IIa)

In General Formula (IIa), u is 0 or 1, v is 0 or a positive integer, preferably an integer of equal to or more than 0 and equal to or less than 2, and more preferably 0 or 1, w is 0 or 1, $R^{61}$ to $R^{78}$ and $R^{a1}$ and $R^{b1}$ may be the same or different from each other and are each a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may be bonded to each other to form a monocyclic ring or a polycyclic ring.

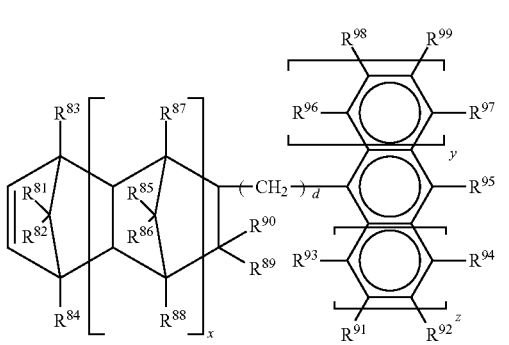

(IIIa)

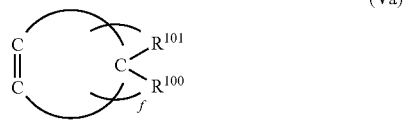

(Va)

In General Formula (Va), $R^{100}$ and $R^{101}$ may be the same or different from each other, and each represent a hydrogen atom or a hydrocarbon group having 1 to 5 carbon atoms, and f is $1 \leq f \leq 18$.

In General Formula (IIIa), x and d are each an integer of 0 or equal to or more than 1, preferably an integer of equal to or more than 0 and equal to or less than 2, and more preferably 0 or 1, y and z are each 0, 1, or 2, $R^{81}$ to $R^{99}$ may be the same or different from each other and are each a hydrogen atom, a halogen atom, an aliphatic hydrocarbon group that is an alkyl group having 1 to 20 carbon atoms or a cycloalkyl group having 3 to 15 carbon atoms, and an aromatic hydrocarbon group having 6 to 20 carbon atoms or an alkoxy group, a carbon atom to which $R^{89}$ and $R^{90}$ are bonded and a carbon atom to which $R^{93}$ is bonded or a carbon atom to which $R^{91}$ is bonded may be bonded directly or through an alkylene group having 1 to 3 carbon atoms, and in a case of y=z=0, $R^{95}$ and $R^{92}$ or $R^{95}$ and $R^{99}$ may be bonded to each other to form a monocyclic aromatic ring or a polycyclic aromatic ring.

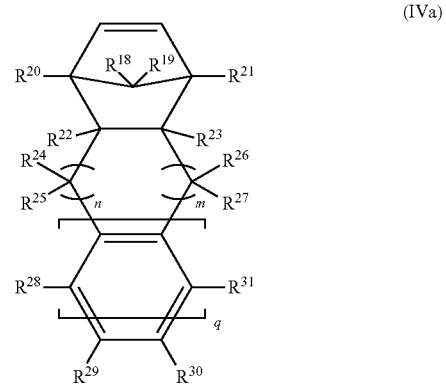

(IVa)

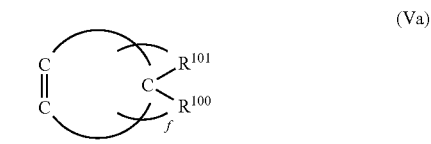

(VIa)

In General Formula (VIa), q is 1, 2, or 3, preferably 1 or 2, and more preferably 1.

$R^{32}$ to $R^{39}$ are each independently a hydrogen atom, a halogen atom excluding a fluorine atom, or a hydrocarbon group having 1 to 20 carbon atoms, which may be substituted with a halogen atom excluding a fluorine atom.

$R^{32}$ to $R^{39}$ are each independently preferably a hydrogen atom or a hydrocarbon group having 1 to 20 carbon atoms and more preferably a hydrogen atom.

In addition, in a case of q=1, $R^{36}$ and $R^{37}$, $R^{37}$ and $R^{38}$, and $R^{38}$ and $R^{39}$ may be bonded to each other to form a monocyclic ring or a polycyclic ring and in a case of q=2 or 3, $R^{36}$ and $R^{36}$, $R^{36}$ and $R^{37}$, $R^{37}$ and $R^{38}$, $R^{38}$ and $R^{39}$, and $R^{39}$ and $R^{39}$ may be bonded to each other to form a monocyclic ring or a polycyclic ring, the monocyclic ring or the polycyclic ring may have a double bond, and the monocyclic ring or the polycyclic ring may be an aromatic ring.

Examples of the hydrocarbon group having 1 to 20 carbon atoms each independently include an alkyl group having 1 to 20 carbon atoms, a cycloalkyl group having 3 to 15 carbon atoms, an aromatic hydrocarbon group, and the like. More specifically, examples of the alkyl group include a methyl group, an ethyl group, a propyl group, an isopropyl group, an amyl group, a hexyl group, an octyl group, a decyl group, a dodecyl group, an octadecyl group, and the like, and examples of the cycloalkyl group include a cyclohexyl group and the like, and examples of the aromatic hydrocarbon group include an aryl group such as a phenyl group, a trill group, a naphthyl group, a benzyl group, and a phenylethyl group, or an aralkyl group and the like. These hydrocarbon groups may be substituted with halogen atoms excluding fluorine atoms.

In General Formula (IVa), n and m are each independently 0, 1, or 2, q is 1, 2, or 3. m is preferably 0 or 1, and more preferably 1. n is preferably 0 or 1, and more preferably 0. q is preferably 1 or 2, and more preferably 1.

$R^{18}$ to $R^{31}$ are each independently a hydrogen atom, a halogen atom excluding a fluorine atom, or a hydrocarbon group having 1 to 20 carbon atoms, which may be substituted with a halogen atom excluding a fluorine atom, and $R^{18}$ to $R^{31}$ are each independently preferably a hydrogen atom or a hydrocarbon group having 1 to 20 carbon atoms, and more preferably a hydrogen atom.

In addition, in a case of q=1, $R^{28}$ and $R^{29}$, $R^{29}$ and $R^{30}$, and $R^{30}$ and $R^{31}$ may be bonded to each other to form a monocyclic ring or a polycyclic ring, in a case of q=2 or 3, $R^{28}$ and $R^{28}$, $R^{28}$ and $R^{29}$, $R^{29}$ and $R^{30}$, $R^{30}$ and $R^{31}$, and $R^{31}$ and $R^{31}$ may be bonded to each other to form a monocyclic ring or a polycyclic ring, and the monocyclic ring or the polycyclic ring may be an aromatic ring.

Since the olefin monomer represented by General Formula (Ia) described above and the cyclic olefin monomers (b) represented by General Formula (IIa), (IIIa), (IVa), (Va), and (VIa) are used as a copolymerization component to further improve the solubility of the cyclic olefin-based polymer (A) in a solvent, the moldability is improved, and the yield of the product is improved.

Regarding specific examples of the cyclic olefin monomers (b) represented by General Formula (IIa), (IIIa), and (Va), compounds described in paragraphs 0037 to 0063 of Pamphlet of International Publication No. WO2006/118261 can be used.

Specifically, examples thereof include bicyclo-2-heptene derivatives (bicyclohept-2-ene derivatives), tricyclo-3-decene derivatives, tricyclo-3-undecene derivatives, tetracyclo-3-dodecene derivatives, pentacyclo-4-pentadecene derivatives, pentacyclo pentadecadien derivatives, pentacyclo-3-pentadecene derivatives, pentacyclo-4-hexadecene derivatives, pentacyclo-3-hexadecene derivatives, hexacyclo-4-heptadecene derivatives, heptacyclo-5-eicosene derivatives, heptacyclo-4-eicosene derivatives, heptacyclo-5-heneicosene derivatives, octacyclo-5-docosene derivatives, nonacyclo-5-pentacosene derivatives, nonacyclo-6-hexacosene derivatives, cyclopentadiene-acenaphthylene adducts, 1,4-methano-1,4,4a, 9a-tetrahydrofluorene derivatives, 1,4-methano-1,4,4a, 5,10,10a-hexahydroanthracene derivatives, cycloalkylene derivatives having 3 to 20 carbon atoms, and the like.

Among the cyclic olefin monomers (b) represented by General Formulae (IIa), (IIIa), (IVa), (Va), and (VIa), the cyclic olefin represented by General Formula (IIa) is preferable.

In addition, it is preferable to use the cyclic olefin represented by General Formula (IIa) and any of the cyclic olefin represented by General Formula (IIIa), (IVa), (Va), or (VIa).

As the cyclic olefin monomer (b) represented by General Formula (IIa), bicyclo[2.2.1]-2-heptene (also referred to as norbornene) or tetracyclo[$4.4.0.1^{2,5}.1^{7,10}$]-3-dodecene (also referred to as tetracyclododecene) is preferably used, and tetracyclo[$4.4.0.1^{2,5}.1^{7,10}$]-3-dodecene is more preferably used. Since such a cyclic olefin has a rigid ring structure, there is an advantage that elastic modulus of the copolymer and the molded product can be easily maintained.

As the cyclic olefin monomer (b) represented by General Formula (VIa), it is preferable to use a monomer in which q=1 in Formula (VIa). Since such a cyclic olefin has one benzene ring, there is an advantage that a resin composition that is difficult to be colored as compared with the case of a cyclic olefin having two or more benzene rings can be easily obtained. In particular, it is preferable to use benzonorbornadiene. An advantage of using benzonorbornadiene is that benzonorbornadiene has an aromatic ring, so that a refractive index of the resin composition can be increased.

In a case where the total of the constituent units constituting the copolymer (A1) according to the present embodiment is 100 mol %, a percentage of the repeating unit (b) derived from the cyclic olefin monomer (b) is preferably equal to or more than 5 mol % and equal to or less than 95 mol %, more preferably equal to or more than 10 mol % and equal to or less than 80 mol %, even more preferably equal to or more than 15 mol % and equal to or less than 60 mol %, and particularly preferably equal to or more than 20 mol % and equal to or less than 50 mol %.

A copolymerization type of the copolymer (A1) according to the present embodiment is not particularly limited, and examples thereof can include random copolymers, block copolymers, and the like. In the present embodiment, a random copolymer is preferably used as the copolymer (A1) according to the present embodiment, from the viewpoint that the optical component excellent in optical properties such as transparency, a refractive index, and a birefringence index and having high accuracy can be obtained.

Examples of the copolymer (A1) according to the present embodiment preferably include a random copolymer of ethylene and tetracyclo[$4.4.0.1^{2,5}.1^{7,10}$]-3-dodecene, a random copolymer of ethylene and bicyclo[2.2.1]-2-heptene, and a random copolymer of ethylene, tetracyclo[$4.4.0.1^{2,5}.1^{7,10}$]-3-dodecene, and benzonorbornadiene, and more preferably include a random copolymer of ethylene and tetracyclo[$4.4.0.1^{2,5}.1^{7,10}$]-3-dodecene, and a random copolymer of ethylene, tetracyclo[$4.4.0.1^{2,5}.1^{7,10}$]-3-dodecene, and benzonorbornadiene.

As the cyclic olefin-based polymer (A), the ring-opening polymer (A2) of cyclic olefin can be used.

Examples of the ring-opening polymer (A2) of the cyclic olefin include a ring-opening polymer of a norbornene-based monomer and a ring-opening polymer of a norbornene-based monomer and other monomers capable of ring-opening copolymerization with the norbornene-based monomer, and hydrogenated products thereof.

Examples of the norbornene-based monomer include bicyclo[2.2.1]hept-2-ene (trivial name: norbornene) and derivatives thereof (having a substituent in a ring thereof), tricyclo[$4.3.0.1^{1,6}.1^{2,5}$]-deca-3,7-diene (trivial name dicyclopentadiene) and derivatives thereof, 7,8-benzotricyclo[$4.3.0.1^{2,5}$]deca-3-ene (trivial name: metanotetrahydrofluorene, also referred to as 1,4-methano-1,4,4a, 9a-tetrahydrofluorene) and derivatives thereof, tetracyclo[$4.4.0.1^{2,5}.1^{7,10}$]-3-dodecene (trivial name: tetracyclododecene) and derivatives thereof, and the like.

Examples of the substituent substituted with a ring of each derivative include an alkyl group, an alkylene group, a vinyl group, an alkoxycarbonyl group, an alkylidene group, and the like. One or two or more substituents may be contained. Examples of the derivative having a substituent contained in such a ring include 8-methoxycarbonyl-tetracyclo[$4.4.0.1^{2,5}.1^{7,10}$]dodeca-3-ene, 8-methyl-8-methoxycarbonyl-tetracyclo[$4.4.0.1^{2,5}.1^{7,10}$]dodeca-3-ene, 8-ethylidene-tetracyclo[$4.4.0.1^{2,5}.1^{7,10}$]dodeca-3-ene, and the like.

These norbornene-based monomers are each used alone, or two or more norbornene-based monomers are used in combination.

The ring-opening polymer of a norbornene-based monomer or the ring-opening polymer of a norbornene-based monomer and other monomers capable of ring-opening copolymerization with the norbornene-based monomer can be obtained by polymerization of a monomer component in the presence of a known ring-opening polymerization catalyst.

As the ring-opening polymerization catalyst, for example, a catalyst consisting of a metal halide such as ruthenium and osmium, a nitrate or an acetylacetone compound, and a reducing agent; and a catalyst consisting of a halide or an acetylacetone compound such as titanium, zirconium, tungsten, and molybdenum, and an organoaluminum compound; and the like can be used.

Examples of other monomers capable of ring-opening copolymerization with the norbornene-based monomer include monocyclic cyclic olefin monomers such as cyclohexene, cycloheptene, and cyclooctene.

A hydrogenated product of the ring-opening polymer of a norbornene-based monomer or a hydrogenated product of the ring-opening polymer of a norbornene-based monomer and other monomers capable of ring-opening copolymerization with the norbornene-based monomer can be usually obtained such that a known hydrogenation catalyst containing a transition metal such as nickel or palladium is added to a polymerization solution of the ring-opening polymer, and a carbon-carbon unsaturated bond is subjected to hydrogenation.

In the present embodiment, one kind of the cyclic olefin-based polymer (A) may be used alone, or two or more kinds thereof may be used in combination.

The copolymer (A1) according to the present embodiment can be produced by selecting an appropriate condition according to methods described in, for example, Japanese Published Patent Application A-S60-168708, Japanese Published Patent Application A-S61-120816, Japanese Published Patent Application A-S61-115912, Japanese Published Patent Application A-S61-115916, Japanese Published Patent Application A-S61-271308, Japanese Published Patent Application A-S61-272216, Japanese Published Patent Application A-S62-252406, Japanese Published Patent Application A-S62-252407, and the like.

The ring-opening polymer (A2) of the cyclic olefin according to the present embodiment can be produced by selecting an appropriate condition according to methods described in, for example, Japanese Published Patent Application A-S60-26024, Japanese Published Patent Application A-H09-268250, Japanese Published Patent Application A-S63-145324, Japanese Unexamined Patent Publication No. 2001-72839, and the like.

According to ASTM D1238, the lower limit of a melt flow rate (MFR) of the cyclic olefin-based polymer (A) measured at 260° C. and a load of 2.16 kg is preferably equal to or more than 5 g/10 minutes, more preferably equal to or more than 8 g/10 minutes, and even more preferably equal to or more than 10 g/10 minutes from the viewpoint of processability, ease of manufacture of the cyclic olefin-based polymer (A), and the like.

The upper limit of the MFR of the cyclic olefin-based polymer (A) is, for example, equal to or less than 100 g/10 minutes.

The MFR of the cyclic olefin-based polymer (A) can be adjusted by a ratio of a hydrogen feed amount to an ethylene feed amount during polymerization reaction described later being adjusted, or the like.

A carbon-carbon double bond is preferably not contained in the cyclic olefin-based polymer (A), but in a case where the carbon-carbon double bond is contained, it is preferable to contain equal to or less than 0.5 g of the carbon-carbon double bond in 100 g of the cyclic olefin-based polymer (A). The deterioration of the resin composition can be suppressed by containing substantially no carbon-carbon double bond, which is preferable. A content of the carbon-carbon double bond in the cyclic olefin-based polymer (A) is determined by the iodine value method (titration method) according to JIS K0070.

A glass transition temperature (Tg) of the cyclic olefin-based resin composition according to the present embodiment is preferably within a range of equal to or higher than 130° C. and equal to or lower than 180° C. Since the glass transition temperature (Tg) of the cyclic olefin-based resin composition is within the above range, sufficient heat resistance can be obtained and improved moldability can be obtained in a case where the molded product is used as an optical component such as in-vehicle camera lenses or camera lenses for mobile devices, which requires heat resistance.

Regarding the glass transition temperature (Tg) of the cyclic olefin-based resin composition according to the present embodiment, the glass transition temperature can be measured when for example, the temperature of the cyclic olefin-based resin composition is increased to 200° C. at a temperature increasing rate of 10° C./min from the room temperature under a nitrogen atmosphere by using RDC220 manufactured by SII NanoTechnology Inc., and maintained for 5 minutes, and subsequently, the temperature thereof is decreased to 30° C. at a temperature decreasing rate of 10° C./min and maintained for 5 minutes, and then the temperature thereof is increased to 200° C. at a temperature increasing rate of 10° C./min.

(Hindered Amine Compound (Y))

The hindered amine compound (Y) according to the present embodiment is a compound that contains a piperidyl group represented by General Formula (1) and a carboxylic acid amide group represented by General Formula (2) within the same molecule. The number of piperidyl groups represented by General Formula (1) per molecule may be one or plural.

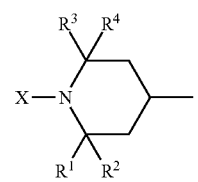

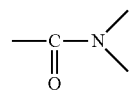

In General Formula (1), X is a hydrogen atom, an oxyradical group, an alkyl group, an alkoxy group, an aryl group, or a hydroxy group, and preferably a hydrogen atom, a methyl group, or an ethyl group, more preferably a hydrogen atom or a methyl group, and particularly preferably a hydrogen atom.

$R^1$, $R^2$, $R^3$, and $R^4$ are each independently a hydrogen atom or an alkyl group, preferably a methyl group or an ethyl group, and more preferably a methyl group.

In General Formula (1), 1 to 12 carbon atoms are preferable in a case where X is an alkyl group, 1 to 12 carbon atoms are preferable in a case where X is an alkoxy group, and 6 to 12 carbon atoms are preferable in a case where X is an aryl group. The alkyl group and alkoxy group represented by X are each independently linear or cyclic and may be branched. The alkyl group, alkoxy group, and aryl group represented by X may each independently have a substituent, and examples of the substituent include a hydroxy group, a benzoyloxy group, an acetoxy group, and the like.

Among the piperidyl groups represented by General Formula (1), a compound having a group in which $R^1$, $R^2$, $R^3$, and $R^4$ are all methyl groups is preferable from the viewpoint of price and availability. In addition, a compound having a piperidyl group in which X is a methyl group or a hydrogen atom is preferable from the viewpoint of price and availability.

The hindered amine compound (Y) according to the present embodiment may have a radical scavenging activity. Therefore, during the production or molding of the cyclic olefin-based resin composition according to the present embodiment, by the hindered amine compound (Y) capturing radicals generated due to heat or light received in the usage environment of the molded product, the oxidation degradation and thermal decomposition of the cyclic olefin-based polymer during the production or molding, and the oxidation degradation and decomposition of the cyclic olefin-based polymer in the molded product due to heat or light can be suppressed.

It is preferable that the hindered amine compound (Y) according to the present embodiment further has an alicyclic structure represented by General Formula (3) within the same molecule. Therefore, the compatibility with the cyclic olefin-based polymer (A) can be further improved, and as a result, the dispersibility of the hindered amine compound (Y) in the cyclic olefin-based polymer (A) can be further improved.

From the viewpoint of further improving the compatibility with the cyclic olefin-based polymer (A), it is preferable that the alicyclic structure represented by General Formula (3) has a spiro-bond.

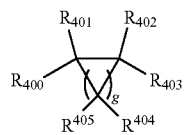
(3)

In General Formula (3), at least one of $R^{400}$, $R^{401}$, $R^{402}$, $R^{403}$, $R^{404}$ or $R^{405}$ is a binder, and except for the binder, remainders are each independently a hydrogen atom or a hydrocarbon group having 1 to 5 carbon atoms, preferably a hydrogen atom or a hydrocarbon group having 1 and 2 carbon atoms, and more preferably a hydrogen atom. g is equal to or more than 1 and equal to or less than 18, preferably equal to or more than 5 and equal to or less than 15, even more preferably equal to or more than 8 and equal to or less than 13, and particularly preferably equal to or more than 9 and equal to or less than 12.

The hindered amine compound (Y) according to the present embodiment even more preferably has a structure represented by General Formula (4). Therefore, the compatibility with the cyclic olefin-based polymer (A) can be further improved, and as a result, the dispersibility of the hindered amine compound (Y) in the cyclic olefin-based polymer (A) can be further improved.

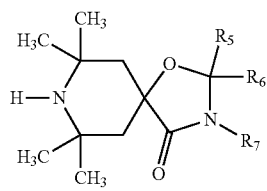
(4)

In General Formula (4), at least one of $R_5$, $R_6$, or Ry is a binder, and except for the binder, $R_5$ and $R_6$ are each independently a hydrogen atom or a hydrocarbon group having 1 to 20 carbon atoms, $R_5$ and $R_6$ may be bonded to each other to form a monocyclic ring or a polycyclic ring, and $R_5$ and $R_6$ are preferably bonded to each other to form an alicyclic structure represented by General Formula (3).

$R_7$ is a hydrogen atom, a hydrocarbon group having 1 to 20 carbon atoms, or a structure represented by General Formula (4-1).

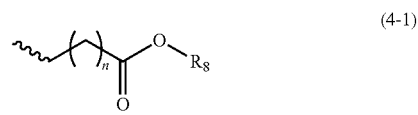
(4-1)

In General Formula (4-1), n is 0 to 10, preferably 1 to 6, and $R_8$ is a hydrocarbon group having 1 to 20 carbon atoms and preferably a hydrocarbon group having 8 to 16 carbon atoms.

Examples of the hindered amine compound (Y) according to the present embodiment include a compound represented by General Formula (5), a compound represented by General Formula (6), and the like. Here, in the compound represented by General Formula (5),

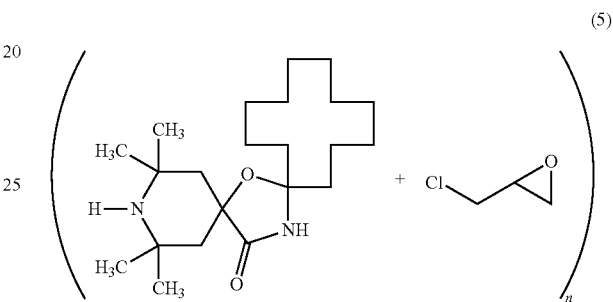
(5)

n is, for example, 1 to 20, and preferably 1 to 15. Here, the compound represented by General Formula (5) has a structure in which the above two monomers react with each other to form a polymer, which represents a polymer of 2,2,4,4-tetramethyl-7-oxa-3,20-diazadispiro-[5.1.11.2]henicosan-21-one and epichlorohydrin.

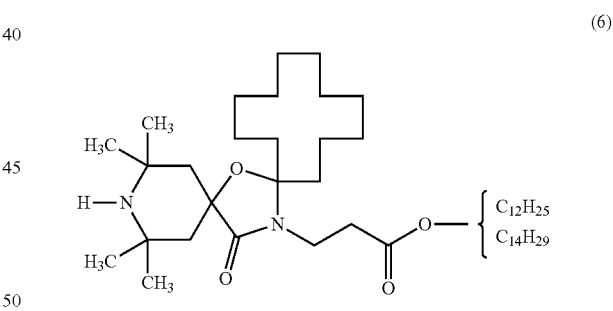
(6)

In a case where a content of the cyclic olefin-based polymer (A) contained in the cyclic olefin-based resin composition according to the present embodiment is 100 parts by mass, a content of the hindered amine compound (Y) in the cyclic olefin-based resin composition is preferably equal to or more than 0.05 parts by mass and more preferably equal to or more than 0.10 parts by mass. In a case where the content of the hindered amine compound (Y) is within equal to or more than at least the above lower limit, it is possible to further suppress the occurrence of coloring of the optical component in a high temperature environment.

In addition, in a case where the content of the cyclic olefin-based polymer (A) contained in the cyclic olefin-based resin composition according to the present embodiment is 100 parts by mass, the content of the hindered amine compound (Y) in the cyclic olefin-based resin composition is preferably equal to or less than 5 parts by mass, more preferably equal to or less than 2 parts by mass, and even more preferably equal to or less than 1 part by mass. In a case where the content of the hindered amine compound (Y) is within equal to or more than at least the above upper limit, it is possible to further suppress the occurrence of coloring of the optical component in a high temperature environment.
(Other Components)

In addition to the cyclic olefin-based polymer (A) and the hindered amine compound (Y), the cyclic olefin-based resin composition according to the present embodiment contains a known additive as an optional component within a range in which good physical properties of the cyclic olefin-based resin composition according to the present embodiment are not impaired.

Examples of the additive include antioxidants, secondary antioxidants, lubricants, mold release agents, antifogging agents, weather stabilizers, light stabilizers, ultraviolet absorbers, antistatic agents, metal inactivating agents, and the like.

The cyclic olefin-based resin composition according to the present embodiment can be obtained by a method of melt-kneading the cyclic olefin-based polymer (A) and the hindered amine compound (Y) using a known kneading apparatus such as an extruder and a Banbury mixer; a method in which the cyclic olefin-based polymer (A) and the hindered amine compound (Y) are dissolved in a common solvent and the solvent is then evaporated; a method of adding a solution of the cyclic olefin-based polymer (A) and hindered amine compound (Y) to a poor solvent and precipitating the mixture; and the like.

[Molded Product and Optical Component]

Next, the molded product of the embodiment according to the present invention will be described.

The molded product according to the present embodiment contains the cyclic olefin-based resin composition according to the present embodiment.

Since the molded product according to the present embodiment contains the cyclic olefin-based resin composition according to the present embodiment, the optical performance is excellent. Therefore, the molded product can be suitably used as an optical component in an optical system that needs to identify an image with high accuracy. The optical components are components used in optical system equipment, and the like, and specific examples thereof include lenses for various sensors, pickup lenses, projector lenses, prisms, fθ lenses, imaging lenses, light guide plates, head mount display lenses, and the like. From the viewpoint of the effect according to the present embodiment, the optical components can be suitably used for an fθ lens, imaging lenses, sensor lenses, prisms, or light guide plates.

A method of obtaining a molded product by molding the cyclic olefin-based resin composition according to the present embodiment is not particularly limited, and a known method can be used. Depending on applications and shapes, for example, extrusion molding, injection molding, inflation molding, blow molding, extrusion blow molding, injection blow molding, press molding, vacuum molding, powder slush molding, calendar molding, foam molding, and the like can be applied. Among these, an injection molding method is preferable from the viewpoint of moldability and productivity. Molding conditions are appropriately selected depending on the purpose of use or molding methods, and for example, a resin temperature in the injection molding is usually appropriately selected within a range of 150° C. to 400° C., preferably 200° C. to 350° C., and more preferably 230° C. to 330° C.

As described above, the embodiments of the present invention have been described, but these are examples of the present invention, and various configurations other than the above can be adopted.

In addition, the present invention is not limited to the above described embodiment, and modifications, improvements, and the like within the range in which the object of the present invention can be achieved are included in the present invention.

EXAMPLES

Hereinafter, the present invention will be described in more detail with reference to Examples, but the present invention is not limited thereto.
<Synthesis of Cyclic Olefin-Based Polymer (A-1) (Addition Polymer)>
(Catalyst Preparation)

$VO(OC_2H_5)Cl_2$ was diluted with cyclohexane to prepare a vanadium catalyst having a vanadium concentration of 6.7 mmol/L-cyclohexane. Ethylaluminum sesquichloride (Al $(C_2H_5)_{1.5}Cl_{1.5}$) was diluted with cyclohexane to prepare an organoaluminum compound catalyst having an aluminum concentration of 107 mmol/L-cyclohexane.
(Polymerization)

A stirring polymerizer (an inner diameter of 500 mm, a reaction volume of 100 L) was used to continuously carry out a copolymerization reaction of ethylene and tetracyclo $[4.4.0.1^{2,5}.1^{7,10}]$-3-dodecene. Here, ethylene was supplied into the polymerizer together with hydrogen gas.

During this copolymerization reaction, the vanadium catalyst prepared by the above method was supplied in an amount such that a vanadium catalyst concentration with respect to cyclohexane in the polymerizer, which is used as a polymerization solvent, is 0.6 mmol/L.

In addition, ethylaluminum sesquichloride that is an organoaluminum compound was supplied into the polymerizer in an amount to be Al/V of 18.0. The copolymerization reaction was continuously carried out under conditions in which a polymerization temperature was 8° C. and a polymerization pressure was 1.8 kg/cm$^2$G.
(Deashing)

The polymerization reaction was terminated by adding water and an NaOH solution having a concentration of 25% by mass as a pH adjuster with respect to a copolymer solution of ethylene and tetracyclo[$4.4.0.1^{2,5}.1^{7,10}$]-3-dodecene extracted from the polymerizer. In addition, a catalyst residue present in the copolymer was removed (deashing) from the copolymer solution.
(Desolvent)

A cyclohexane solution of the above copolymer, which has a concentration of the copolymer of 5% by mass in the cyclohexane solution, was supplied into a double-tube heater (outer tube diameter of 2B, inner tube diameter of 3/4B, and length of 21 m), in which 20 kg/cm$^2$G steam is used as a heat source, in an amount of 150 kg/h and heated to 180° C.

A random copolymer (cyclic olefin-based polymer (A-1)) of ethylene and tetracyclo[$4.4.0.1^{2,5}.1^{7,10}$]-3-dodecene in a molten state was obtained by using a double-tube flash dryer (outer tube diameter of 2B, inner tube diameter of 3/4B, and length of 27 m) that uses 25 kg/cm$^2$G of steam as a heat source and a flash hopper (volume of 200 L), removing most of unreacted monomers together with cyclohexane as a polymerization solvent from the cyclohexane solution of the copolymer that has been heated, and being flash dried.
(Extrusion)

By the use of a twin screw kneading extruder with a vent, the cyclic olefin-based polymer (A-1) in the molten state was charged to a resin charging portion of an extruder. Next, while being aspirated through a trap by a vacuum pump for the purpose of removing a volatile component from the vent site, an extruder condition was adjusted so that the difference between the maximum value and minimum value of a resin temperature of an extruder diverter portion is within 3° C. Next, the resulting product was made into a pellet by an underwater pelletizer equipped to an outlet of the extruder, and the obtained pellet was dried with heated air at 100° C. for 4 hours. The glass transition temperature (Tg) of the cyclic olefin-based polymer A-1 was 151° C., and the MFR was 28 g/10 minutes (260° C. and load of 2.16 kg).

<Synthesis of Cyclic Olefin-Based Polymer (A-2) (Ring-Opening Polymer)>
(Polymerization)

Tetracyclo[4.4.0.1$^{2,5}$.1$^{7,10}$]-3-dodecene, dehydrated toluene, and hexadiene were placed into a fully nitrogen-substituted glass reactor, a temperature thereof was increased to 50° C., and the resulting product was stirred. Grubbs Catalyst (registered trademark) 2nd Generation was added as a catalyst, and a reaction was carried out with stirring, and after 10 minutes, butyraldehyde was added dropwise to terminate the reaction.

The solution obtained after the reaction was added dropwise to acetone for crystallization, filtration, and then dried under reduced pressure at 80° C. to obtain a resin a'.
(Hydrogenation)

The resin a', cyclohexane, bis(tricyclohexylphosphine) benzylidine ruthenium (IV) dichloride, and ethyl vinyl ether were placed into a fully nitrogen-substituted autoclave, hydrogen pressure at 8 atm was applied thereto, the temperature was increased to 120° C., and a reaction was carried out for 10 hours.

After termination of the reaction, the reacted solution was added dropwise to acetone for crystallization, filtration, and then dried under reduced pressure at 80° C. to obtain a cyclic olefin-based polymer (A-2).

In a case where the cyclic olefin-based polymer (A-2) was observed by 1H-NMR, it was confirmed that peaks of protons derived from an aromatic ring and other double bonds had disappeared.
(Extrusion)

The cyclic olefin-based polymer (A-2) was made into a pellet under conditions of a set temperature of 270° C., a resin extrusion rate of 80 g/min, and a screw rotation speed of 200 rpm by using a twin screw extruder BT-30 (screw diameter of 30 mmφ, L/D=46) manufactured by Research Laboratory of Plastics Technology Co., Ltd., to obtain pellets. A glass transition temperature (Tg) of the cyclic olefin-based polymer A-2 was 174° C., and the MFR was 30 g/10 minutes (260° C. and load of 2.16 kg).

<Synthesis of Cyclic Olefin-Based Polymer (A-3) (Addition Polymer)>
(Polymerization)

Nitrogen was circulated as an inert gas at a flow rate of 300 Nl/h for 60 minutes in a pressure resistant reaction vessel of 0.5 m$^3$, which is equipped with a stirrer, and cyclohexane, tetracyclo[4.4.0.1$^{2,5}$.1$^{7,10}$]-3-dodecene (40 mol, hereinafter tetracyclododecene,) and benzonorbornadiene (88 mol, hereinafter BNBD) were then added. Next, while stirring the polymerization solvent at a rotation speed of 600 rpm, a solvent temperature was increased to 50° C.

After the solvent temperature reaches a predetermined temperature, the circulating gas was switched from nitrogen to ethylene, ethylene was circulated to a reaction vessel at a supply rate of 150 Nl/h, and hydrogen was circulated to a reaction vessel at a supply rate of 6.0 Nl/h. After 10 minutes, polymethylaluminoxane (PMAO) (1.8 mol) and a transition metal compound (1) (0.0030 mol) represented by the following Formula as catalysts were added to a pressure resistant reaction vessel to initiate polymerization. The transition metal compound (1) was synthesized by a method described in Japanese Unexamined Patent Publication No. 2004-331965.

Transition metal compound (1)

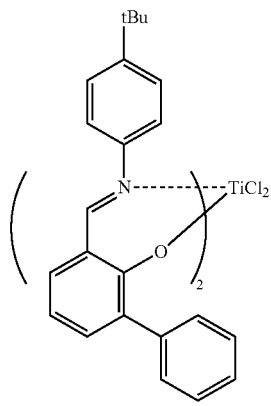

(Deashing and Desolvent)

After 10 minutes had passed from the initiation of the polymerization, 5 L of isobutyl alcohol was added to terminate the polymerization to obtain a polymerization solution containing a copolymer of ethylene, tetracyclododecene, and BNBD. Thereafter, the polymerization solution was transferred to a vessel of 2 m$^3$, an aqueous solution prepared by adding 5 mL of concentrated hydrochloric acid with respect to 1 L of water and the polymerization solution were brought into contact with each other at a ratio of 1:1 for 2 hours under strong stirring using a homomixer, and a catalyst residue was transferred to an aqueous phase. After leaving this contact mixture to stand, the aqueous phase was separated and removed, and further washed with distilled water twice to separate a polymer liquid phase. In a vessel equipped with a stirrer and containing 3 times the amount of acetone with respect to this separated and purified polymerization solution, the polymerization solution after deashing was added and while performing the stirring, so that a copolymer was precipitated. The precipitated copolymer was filtered to separate filtrate, pentaerythritol tetrakis (3-(3,5-di-tert-butyl-4-hydroxyphenyl) propionate that has been dissolved in acetone, manufactured by BASF SE; Irganox 1010) was added thereto, and drying was performed under reduced pressure at 130° C. for 10 hours to obtain 4.5 kg of a white powdery ethylene tetracyclododecene BNBD copolymer.

Example 1

0.4 parts by mass of a polymer of 2,2,4,4-tetramethyl-7-oxa-3,20-diazadispiro-[5.1.11.2]henicosan-21-one as a hindered amine compound and epichlorohydrin (manufactured by Clariant Chemicals Co., Ltd.; HOSTAVIN N30, hereinafter, referred to as a hindered amine compound (b1)) were added and mixed with respect to 100 parts by mass of the cyclic olefin-based polymer (A-1).

A mixture was charged into a resin charging portion of a twin screw extruder with a screw diameter of @44 mm and L/D=30, which is rotated in the same direction, and melt-kneaded under conditions of a screw rotation speed of 150 rpm and a motor power of 30 kW, and extruded as strands, and the extruded strands were cut with a pelletizer to obtain a pellet-shaped resin composition D1 containing the cyclic olefin-based polymer (A-1) and the hindered amine compound (b1).

Example 2

A resin composition D2 containing the cyclic olefin-based polymer (A-1) and the hindered amine compound (b1) was obtained in the same manner as in Example 1, except that an additive amount of the hindered amine compound (b1) was changed to 0.2 parts by mass with respect to 100 parts by mass of the cyclic olefin-based polymer (A-1).

Example 3

A resin composition D3 containing the cyclic olefin-based polymer (A-2) and the hindered amine compound (b1) was obtained in the same manner as in Example 1, except that the cyclic olefin-based polymer (A-2) was used instead of the cyclic olefin-based polymer (A-1).

Example 4

A resin composition D4 containing the cyclic olefin-based polymer (A-2) and the hindered amine compound (b1) was obtained in the same manner as in Example 3, except that an additive amount of the hindered amine compound (b1) was changed to 0.2 parts by mass with respect to 100 parts by mass of the cyclic olefin-based polymer (A-2).

Example 5

A resin composition D5 containing the cyclic olefin-based polymer (A-1) and a hindered amine compound (b4) was obtained in the same manner as in Example 1, except that n-dodecyl/n-tetradecyl-3-(2,2,4,4-tetramethyl-21-oxo-7-oxa-3,20-diazadispiro-[5.1.11.2]henicosan-20-yl) propanoate (manufactured by Clariant Chemicals Co., Ltd.; HOSTAVIN 3050, hereinafter, referred to as the hindered amine compound (b4)) was used instead of the hindered amine compound (b1).

Example 6

A resin composition D6 containing the cyclic olefin-based polymer (A-1) and the hindered amine compound (b4) was obtained in the same manner as in Example 5, except that an additive amount of the hindered amine compound (b4) was changed to 0.2 parts by mass with respect to 100 parts by mass of the cyclic olefin-based polymer (A-1).

Example 7

0.4 parts by mass of the hindered amine compound (b1) were added and mixed with respect to 100 parts by mass of a cyclic olefin-based polymer (A-3). The above mixture was kneaded at a rotation speed of 50 rpm for 10 minutes by using a twin screw kneader (manufactured by Toyo Seiki Seisaku-sho, Ltd.; Labo Plastomill 4C150-01) that is set at 260° C. to obtain a resin composition D7 containing the cyclic olefin-based polymer (A-3) and the hindered amine compound (b1).

Example 8

A resin composition D8 containing the cyclic olefin-based polymer (A-3) and the hindered amine compound (b1) was obtained in the same manner as in Example 7, except that an additive amount of the hindered amine compound (b1) was changed to 0.2 parts by mass with respect to 100 parts by mass of the cyclic olefin-based polymer (A-3).

Comparative Example 1

A resin composition E1 containing the cyclic olefin-based polymer (A-1) and a hindered amine compound (b2) was obtained in the same manner as in Example 1, except that a polymer of dimethyl succinate and 4-hydroxy-2,2,6,6-tetramethyl-1-piperidinethanol (manufactured by BASF SE; Tinuvin 622, hereinafter, referred to as the hindered amine compound (b2)) was used instead of the hindered amine compound (b1), and 0.8 parts by mass of the hindered amine compound (b2) were added with respect to 100 parts by mass of the cyclic olefin-based polymer (A-1).

Comparative Example 2

A resin composition E2 containing the cyclic olefin-based polymer (A-1) and the hindered amine compound (b2) was obtained in the same manner as in Comparative Example 1, except that an additive amount of the hindered amine compound (b2) was changed to 0.4 parts by mass with respect to 100 parts by mass of the cyclic olefin-based polymer (A-1).

Comparative Example 3

A resin composition E3 containing the cyclic olefin-based polymer (A-1) and a hindered amine compound (b3) was obtained in the same manner as in Comparative Example 2, except that a polymer of 2,4,8,10-tetraoxaspiro[5.5]undecane-3,9-diethanol, 1, 2, 3, 4-butanetetracarboxylic acid, 2,2,6,6-tetramethyl-4-piperidinyl ester, and β, β, β', β'-tetramethyl (manufactured by ADEKA CORPORATION; LA-68, hereinafter, referred to as the hindered amine compound (b3)) was used instead of the hindered amine compound (b2).

Comparative Example 4

The cyclic olefin-based polymer (A-1) was passed through an extruder in the same manner as in Example 1 without adding anything to the cyclic olefin-based polymer (A-1), and made into a pellet to obtain a resin A'.

Comparative Example 5

A resin composition E5 containing the cyclic olefin-based polymer (A-3) and the hindered amine compound (b2) was obtained in the same manner as in Example 7, except that the hindered amine compound (b2) was used instead of the hindered amine compound (b1).

Comparative Example 6

A resin composition E6 containing the cyclic olefin-based polymer (A-3) and the hindered amine compound (b3) was obtained in the same manner as in Comparative Example 5, except that the hindered amine compound (b3) was used instead of the hindered amine compound (b2).

Examples 1 to 6 and Comparative Examples 1 to 4 were evaluated by the following evaluation methods. The evaluation results are shown in Table 1.

(Glass Transition Temperature (Tg) of Resin Composition)

DSC measurement was performed under the following conditions, and glass transition temperatures (Tg) of the resin compositions were measured.

With DSC6220 (manufactured by SII NanoTechnology Inc.), the temperature was increased from 30° C. to 200° C. at a temperature increasing rate of 10° C./min under a nitrogen atmosphere, and then maintained for 5 minutes. Next, the temperature was lowered to 30° C. at a temperature decreasing rate of 10° C./min and then maintained for 5 minutes. Thereafter, a DSC curve in the process of increasing the temperature to 200° C. at the temperature increasing rate of 10° C./min was obtained.

Regarding the DSC curve obtained in the second temperature rise process, a temperature at the point where a straight line at equidistant from an extended straight line of each baseline in the vertical axis direction interseced with a curve of a stepwise change part of the glass transition was used as a glass transition temperature.

(Evaluation Method of Molded Product)

(1) Square Plate Molding

The resin compositions obtained in Examples 1 to 6 and Comparative Examples 1 to 4 were injection-molded using an injection molding machine (manufactured by Sumitomo Heavy Industries, Ltd.; SE30DUZ) at a cylinder temperature of 270° C. and a mold temperature of 126° C., and test pieces each of which is provided with an optical surface having 35 mm×65 mm× a thickness of 3 mmt were produced.

(2) Internal Haze

Each test piece of 35 mm×65 mm× a thickness of 3 mmt obtained above was measured with a haze meter based on JIS K-7105 using benzyl alcohol.

(3) Heat Resistance Test

Each test piece obtained above having 35 mm×65 mm× a thickness of 3 mmt was left to stand in an oven at a temperature of 125° C. for 1008 hours in the atmosphere.

(4) Transmittance Measurement

A total light transmittance of each test piece before and after the heat resistance test was measured using an ultraviolet-visible spectrophotometer. A variance in transmittance (%) before the test and transmittance after the test at a wavelength of 450 nm ((transmittance after test (%))−(transmittance before test (%))) is evaluated as Δ transmittance (%).

TABLE 1

| | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Resin composition | | D1 | D2 | D3 | D4 | D5 | D6 | E1 | E2 | E3 | A' |
| Cyclic olefin-based polymer | Kind | (A-1) | (A-1) | (A-2) | (A-2) | (A-1) | (A-1) | (A-1) | (A-1) | (A-1) | (A-1) |
| | Parts by mass | 100 | 100 | 100 | 100 | 100 | 100 | 100 | 100 | 100 | 100 |
| Hindered amine compound | Kind | b1 | b1 | b1 | b1 | b4 | b4 | b2 | b2 | b3 | — |
| | Parts by mass | 0.4 | 0.2 | 0.4 | 0.2 | 0.4 | 0.2 | 0.8 | 0.4 | 0.4 | — |
| Glass transition temperature (° C.) | | 150 | 152 | 168 | 169 | 142 | 146 | 131 | 140 | 141 | 151 |
| Internal haze (%) | | 0.1 | 0.1 | 0.1 | 0.1 | 0.1 | 0.1 | 0.1 | 0.1 | 0.1 | 0.1 |
| Δ Transmittance (wavelength of 450 nm) (%) | | −1.4 | −1.5 | −3.0 | −2.9 | −2.4 | −1.6 | −54.6 | −63.0 | −13.0 | −27.4 |

Examples 7 and 8 and Comparative Examples 5 and 6 were evaluated by the following evaluation methods. The evaluation results are shown in Table 2.

(Glass Transition Temperature (Tg) of Resin Composition)

Measurements were carried out in the same manner as in Examples 1 to 6 and Comparative Examples 1 to 4.

(Evaluation Method of Molded Product)

(1) Square Plate Molding

The resin compositions obtained in Examples 7 and 8 and Comparative Examples 5 and 6 were subjected to press molding at a pressure of 10 MPa using a hydraulic hand press machine (manufactured by Toyo Seiki Seisaku-sho, Ltd.; MINI TEST PRESS-10) that is set at 260° C., and test pieces each of which has 30 mm×60 mm×a thickness of 3 mmt were produced, respectively.

(2) Internal Haze

Measurements were carried out in the same manner as in Examples 1 to 6 and Comparative Examples 1 to 4.

(3) Heat Resistance Test

Each test piece obtained above having 30 mm×60 mm× a thickness of 3 mmt was left to stand in an oven at a temperature of 125° C. for 1008 hours in the atmosphere.

(4) Transmittance Measurement

Measurements and evaluations were carried out in the same manner as in Examples 1 to 6 and Comparative Examples 1 to 4.

TABLE 2

|  |  | Example 7 | Example 8 | Comparative Example 5 | Comparative Example 6 |
|---|---|---|---|---|---|
| Resin composition |  | D7 | D8 | E4 | E5 |
| Cyclic olefin-based polymer | Kind | (A-3) | (A-3) | (A-3) | (A-3) |
|  | Parts by mass | 100 | 100 | 100 | 100 |
| Hindered amine compound | Kind | b1 | b1 | b2 | b3 |
|  | Parts by mass | 0.4 | 0.2 | 0.4 | 0.4 |
| Glass transition temperature (° C.) |  | 152 | 153 | 153 | 152 |
| Internal haze (%) |  | 2.6 | 2.9 | 34.4 | 12.6 |
| Δ Transmittance (wavelength of 450 nm) (%) |  | −2.3 | −1.9 | −31.7 | −13.1 |

Priority is claimed on Japanese Patent Application No. 2019-098759, filed May 27, 2019, and Japanese Patent Application No. 2020-048237, filed Mar. 18, 2020, the disclosures of which are incorporated herein its entirety by reference.

The invention claimed is:

1. A cyclic olefin-based resin composition comprising:
a cyclic olefin-based polymer (A); and
a hindered amine compound (Y) that contains a piperidyl group represented by General Formula (1) and a carboxylic acid amide group represented by General Formula (2) within the same molecule,

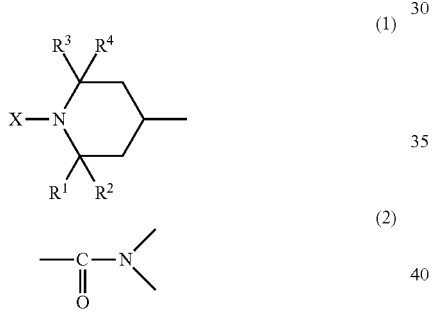

wherein, in General Formula (1), X is a hydrogen atom, an oxyradical group, an alkyl group, an alkoxy group, an aryl group, or a hydroxy group, and $R^1$ to $R^4$ are each independently an alkyl group, wherein the hindered amine compound (Y) further contains an alicyclic structure represented by General Formula (3) within the same molecule,

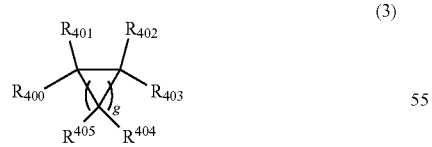

wherein, in General Formula (3), at least one of $R^{400}$, $R^{401}$, $R^{402}$, $R^{403}$, $R^{404}$, or $R^{405}$ is a bond, and except for the bond, remainders are each independently a hydrogen atom or a hydrocarbon group having 1 to 5 carbon atoms, and g is equal to or more than 1 and equal to or less than 18.

2. The cyclic olefin-based resin composition according to claim 1,
wherein the alicyclic structure represented by General Formula (3) has a spiro-bond.

3. The cyclic olefin-based resin composition according to claim 1,
wherein the hindered amine compound (Y) has a structure represented by General Formula (4),

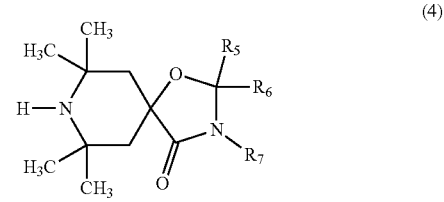

wherein, in General Formula (4), at least one of $R_5$, $R_6$, or $R_7$ is a bond, and except for the bond, $R_5$ and $R_6$ are each independently a hydrogen atom or a hydrocarbon group having 1 to 20 carbon atoms, and $R_7$ is a hydrogen atom, a hydrocarbon group having 1 to 20 carbon atoms, or a structure represented by General Formula (4-1), and

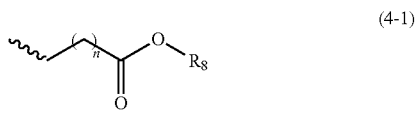

wherein, in General Formula (4-1), n is 0 to 10, and $R_8$ is a hydrocarbon group having 1 to 20 carbon atoms.

4. The cyclic olefin-based resin composition according to claim 1,
wherein the hindered amine compound (Y) includes at least one selected from a compound represented by General Formula (5) or a compound represented by General Formula (6),

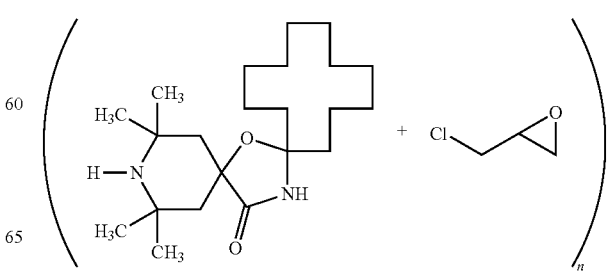

-continued (6)

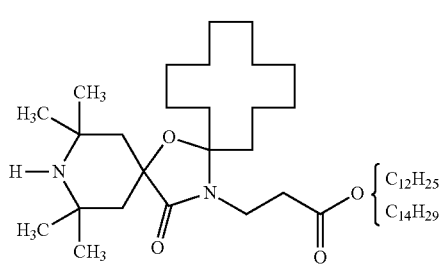

wherein, in General Formula (5), n is 1 to 20.

5. The cyclic olefin-based resin composition according to claim 1,
the cyclic olefin-based polymer (A) includes at least one selected from a copolymer (A1) of ethylene or an α-olefin and a cyclic olefin or a ring-opening polymer (A2) of a cyclic olefin.

6. The cyclic olefin-based resin composition according to claim 5,
wherein the cyclic olefin-based polymer (A) includes the copolymer (A1), and the copolymer (A1) contains
a repeating unit (a) derived from at least one olefin represented by General Formula (I), and
a repeating unit (b) derived from at least one cyclic olefin selected from the group consisting of a repeating unit represented by General Formula (II), a repeating unit represented by General Formula (III), a repeating unit represented by General Formula (IV), a repeating unit represented by General Formula (V), and a repeating unit represented by General Formula (VI), (I)

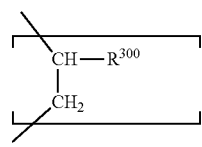

wherein, in General Formula (I), $R^{300}$ represents a hydrogen atom or a linear or branched hydrocarbon group having 1 to 29 carbon atoms, (II)

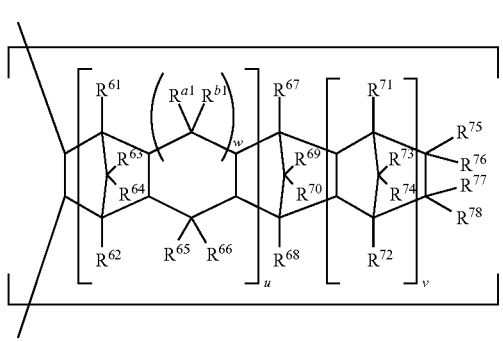

wherein, in General Formula (II), u is 0 or 1, v is 0 or a positive integer, w is 0 or 1, $R^{61}$ to $R^{78}$ and $R^{a1}$ and $R^{b1}$ may be the same or different from each other and are each a hydrogen atom, a halogen atom, an alkyl group having 1 to 20 carbon atoms, a halogenated alkyl group having 1 to 20 carbon atoms, a cycloalkyl group having 3 to 15 carbon atoms, or an aromatic hydrocarbon group having 6 to 20 carbon atoms, and $R^{75}$ to $R^{78}$ may be bonded to each other to form a monocyclic ring or a polycyclic ring, (III)

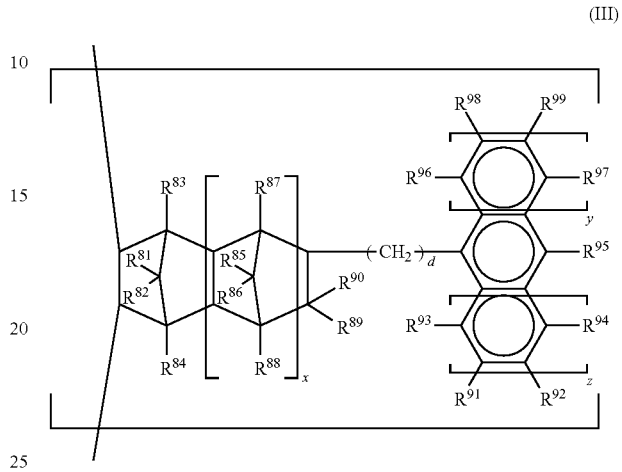

wherein, in General Formula (III), x and d are each an integer of 0 or equal to or more than 1, y and z are each 0, 1, or 2, $R^{81}$ to $R^{99}$ may be the same or different from each other and are each a hydrogen atom, a halogen atom, an aliphatic hydrocarbon group that is an alkyl group having 1 to 20 carbon atoms or a cycloalkyl group having 3 to 15 carbon atoms, and an aromatic hydrocarbon group having 6 to 20 carbon atoms or an alkoxy group, a carbon atom to which R 89 and $R^{90}$ are bonded and a carbon atom to which $R^{93}$ is bonded or a carbon atom to which $R^{91}$ is bonded may be bonded directly or through an alkylene group having 1 to 3 carbon atoms, and in a case of y=z=0, $R^{95}$ and $R^{92}$ or $R^{95}$ and $R^{99}$ may be bonded to each other to form a monocyclic aromatic ring or polycyclic aromatic ring, (IV)

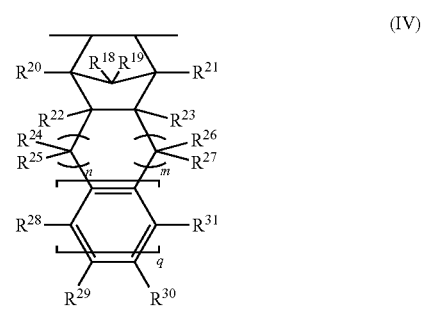

wherein, in General Formula (IV), n and m are each independently 0, 1, or 2, q is 1, 2, or 3, $R^{18}$ to $R^{31}$ are each independently a hydrogen atom, a halogen atom excluding a fluorine atom, or a hydrocarbon group having 1 to 20 carbon atoms, which may be substituted with a halogen atom excluding a fluorine atom, and in a case of q=1, $R^{28}$ and $R^{29}$, $R^{29}$ and $R^{30}$, and $R^{30}$ and $R^{31}$ may be bonded to each other to form a monocyclic ring or a polycyclic ring and in a case of q=2 or 3, $R^{28}$ and $R^{28}$, $R^{28}$ and $R^{29}$, $R^{29}$ and $R^{30}$, $R^{30}$ and $R^{31}$, and $R^{31}$ and $R^{31}$ may be bonded to each other to form a monocyclic ring or a polycyclic ring, and the monocyclic ring or the polycyclic ring may be an aromatic ring,

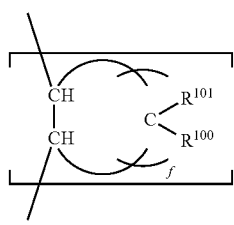
(V)

wherein, in General Formula (V), $R^{100}$ and $R^{101}$ may be the same or different from each other and are each represent a hydrogen atom or a hydrocarbon group having 1 to 5 carbon atoms, and f is $1 \leq f \leq 18$, and

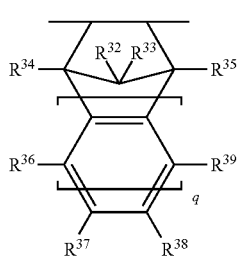
(VI)

wherein, in General Formula (VI), q is 1, 2, or 3, $R^{32}$ to $R^{39}$ are each independently a hydrogen atom, a halogen atom excluding a fluorine atom, or a hydrocarbon group having 1 to 20 carbon atoms, which may be substituted with a halogen atom excluding a fluorine atom, and in a case of q=1, $R^{36}$ and $R^{37}$, $R^{37}$ and $R^{38}$, and $R^{38}$ and $R^{39}$ may be bonded to each other to form a monocyclic ring or a polycyclic ring and in a case of q=2 or 3, $R^{36}$ and $R^{36}$, $R^{36}$ and $R^{37}$, $R^{37}$ and $R^{38}$, $R^{38}$ and $R^{39}$, and $R^{39}$ and $R^{39}$ may be bonded to each other to form a monocyclic ring or a polycyclic ring, the monocyclic ring or the polycyclic ring may have a double bond, and the monocyclic ring or the polycyclic ring may be an aromatic ring.

7. The cyclic olefin-based resin composition according to claim 6,
wherein the repeating unit (b) derived from the cyclic olefin in the copolymer (A1) includes a repeating unit derived from at least one compound selected from bicyclo[2.2.1]-2-heptene, tetracyclo[4.4.0.1$^{2,5}$.1$^{7,10}$]-3-dodecene, and benzonorbornadiene.

8. The cyclic olefin-based resin composition according to claim 6,
wherein the repeating unit (a) derived from the olefin in the copolymer (A1) includes a repeating unit derived from ethylene.

9. The cyclic olefin-based resin composition according to claim 1,
wherein in a case where a content of the cyclic olefin-based polymer (A) contained in the cyclic olefin-based resin composition is 100 parts by mass, a content of the hindered amine compound (Y) is equal to or more than 0.05 parts by mass and equal to or less than 5.0 parts by mass.

10. The cyclic olefin-based resin composition according to claim 1,
wherein a glass transition temperature of the cyclic olefin-based resin composition is within a range of equal to or higher than 130° C. and equal to or lower than 180° C.

11. A molded product comprising the cyclic olefin-based resin composition according to claim 1.

12. An optical component comprising the molded product according to claim 11.

13. The optical component according to claim 12,
wherein the optical component is an fθ lens, an imaging lens, a sensor lens, a prism, or a light guide plate.

* * * * *